UNITED STATES PATENT OFFICE.

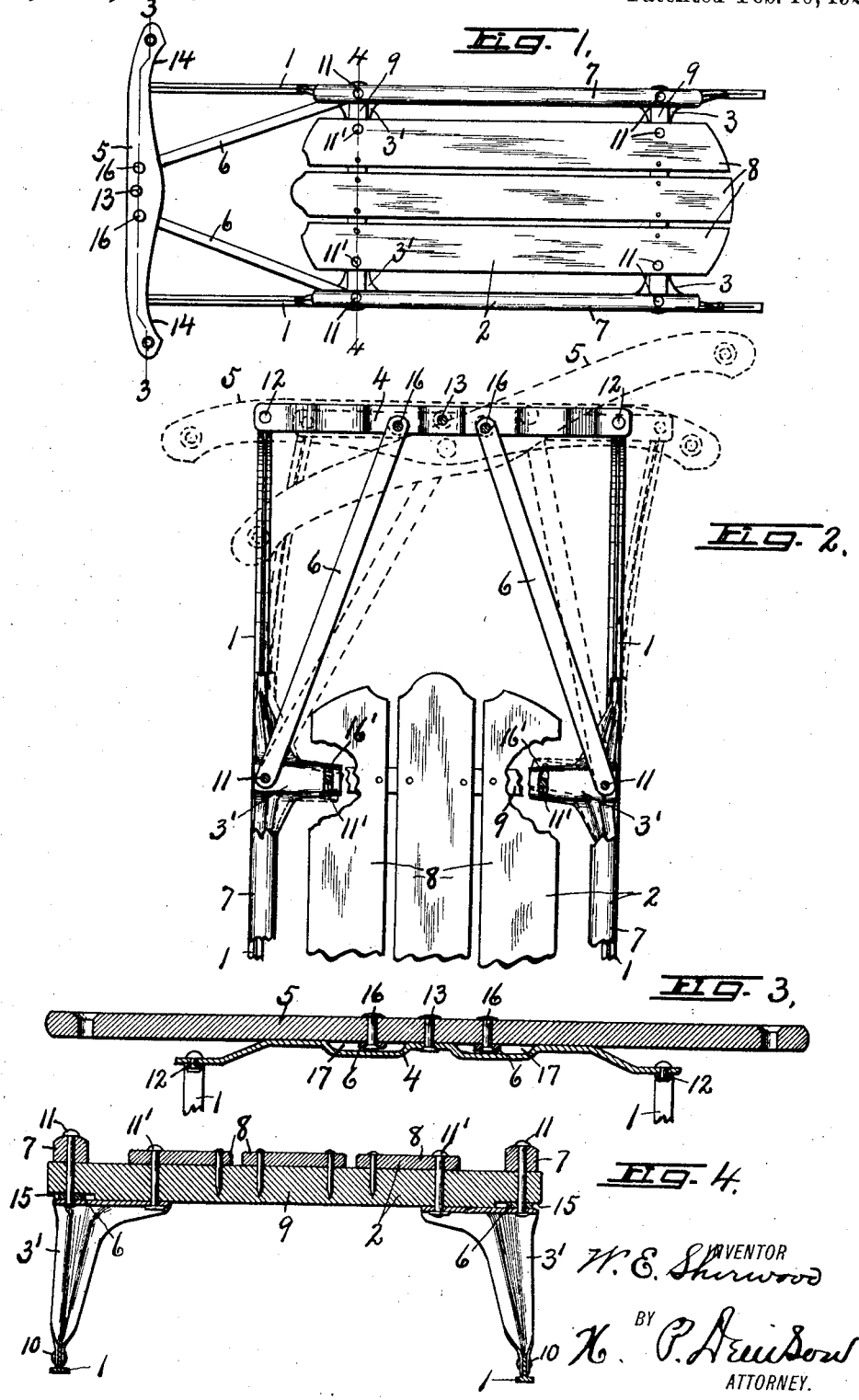

WILLIAM E. SHERWOOD, OF CANASTOTA, NEW YORK, ASSIGNOR TO WATSON PRODUCTS CORPORATION, OF CANASTOTA, NEW YORK, A CORPORATION OF NEW YORK.

HAND-SLED.

1,330,095.　　　Specification of Letters Patent.　　Patented Feb. 10, 1920.

Application filed February 28, 1918. Serial No. 219,631.

*To all whom it may concern:*

Be it known that I, WILLIAM E. SHERWOOD, a citizen of the United States of America, and resident of Canastota, in the county of Madison, in the State of New York, have invented new and useful Improvements in Hand-Sleds, of which the following, taken in connection with the accompanying drawings, is a full, clear, and exact description.

This invention relates to certain improvements in hand sleds, in which the front ends of the runners are free to yield laterally for steering purposes, and refers more particularly to the means for deflecting the yielding ends in either direction.

In this class of sleds, the runners are usually made of spring steel or equivalent metal and are attached to the platform or body by braces or knees arranged in pairs and attached to the normally straight portions of the runners some distance apart from front to rear.

I am aware that it is not broadly new to spring or deflect the portions of the runners at the front of the front braces laterally by means of a foot lever for steering purposes, but one of the objects of my present invention is to provide simple pedal-operated means for deflecting the greater portions of the lengths of the runners in either direction with less liability of interference with the operation of the feet or hands upon the pedals with the parts of the deflecting means than has heretofore been practised.

In other words, one of the specific objects is to enable the front set of braces or knees to shift position with the deflection of the front ends of the runners by the pedal lever so that the deflection of the runners may be carried as far back as the rear set of braces if desired without in any way weakening the function of the front braces.

Another specific object is to produce this lateral deflection with a minimum number of parts, including a pair of links pivotally attached to opposite sides of the platform or body and diverging forwardly close to the central pivotal point of the pedal lever where they are pivotally attached to said lever near the central pivot so as to afford a greater amount of clearance for the operation of the feet upon opposite ends of the pedal.

Another purpose in bringing the pivotal connections between the links and lever close to the central pivot of said lever is to increase the leverage, whereby the deflection of the front ends of the runners may be effected with a minimum power applied to either end of the pedal lever.

Other objects and uses relating to specific parts of the runner-deflecting mechanism will be brought out in the following description.

In the drawings—

Figure 1 is a top plan of a sled embodying the features of my invention.

Fig. 2 is an enlarged top plan partly broken away and partly in section, of the front end of the same sled, showing by dotted lines the position assumed by the pedal lever and links in deflecting the front ends of the runners in one direction, in this instance, to the right, the pedal lever being also shown by dotted lines to disclose the underlying cross bar which connects the extreme front ends of the runners.

Figs. 3 and 4 are transverse vertical sectional views taken, respectively, on lines 3—3 and 4—4, Fig. 1.

As illustrated, this sled comprises a pair of normally parallel runners —1—, a platform or body —2—, front and rear pairs of braces —3— and —3'—, a cross bar —4— connecting the upturned front ends of the runners —1— and suitable means, as the pedal lever —5— and a pair of links —6— coöperating with the cross bar —4— and platform, for deflecting the front ends of the runners in one direction or the other as may be desired.

Each of the runners —1— preferably consists of a steel or equivalent metal bar of inverted T shape in cross section so that the wider flat portions may rest upon the surface over which the sled is moved; the front ends of the runners being curved upwardly in the usual manner so that the corresponding extremities lie in approximately the horizontal plane of the platform or slightly below the same.

The platform or body —2— is relatively shorter than the runners so as to lie between the ends thereof, but some distance rearwardly from the front upturned ends and comprises a pair of opposite longitudinally extending side bars or hand rails —7— and intervening relatively thinner lengthwise slats —8—, preferably in parallel spaced relation with each other and with the side bars —7—, said side bars and slats being secured near their ends to the upper sides of the parallel cross bars —9—, thus constituting the platform or body proper.

The braces or knees —3— and —3'— are similar in form and serve to connect opposite ends of both cross bars —9— to the underlying portions of the runners —1—, each brace preferably consisting of a single piece of sheet metal folded or bent into inverted V-shape and having its apex somewhat shorter transversely than the opposite leg or arm portions and engaged with the under side of the adjacent cross bar to properly support the platform and establish a strong connection between the platform and runners.

The opposite arms of each brace or knee are preferably concavo-convex in cross section with their concave sides facing each other so as to further stiffen the brace and permit the use of comparatively light sheet metal therefor.

The lower ends of the arms of each brace are bifurcated to receive the adjacent portion of the weight of the runner —1— and are secured to said web by rivets —10—, Fig. 4.

The upper portions or apexes of the rear set of braces —3— are rigidly secured by bolts —11— to the under side of the adjacent cross bar —9—, wholly within the opposite longitudinal edges of the platform, as shown more clearly in Fig. 4, said braces serving to hold the adjacent portions of the runners against excessive lateral spring and assure the restoration of the front ends of the runners to their normal straight positions when released after being deflected by the deflecting mechanism, thus causing the runners to normally assume positions parallel with the center line of the platform for straightaway sledding.

The front cross bar —4— connecting the front upturned ends of the runners —1— is preferably made of metal of sufficient strength to hold said runner ends in spaced relation, the connections between said bar and runners preferably consisting of pivotal bolts —12— to permit slight turning movement of the runners and cross bar relatively to each other, as would be necessary when the front ends of the runners are deflected from a straight course.

The pedal lever —5— rests upon the upper face of the cross bar —4— and extends laterally equal distances from the center of said cross bar some distance between the ends thereof, said lever being pivoted at its longitudinal center to the corresponding center of the cross bar —4— by means of a bolt —13— which allows the lever to rock horizontally in opposite directions.

For convenience of operation, the rear edges of opposite ends of the pedal lever —5— are concaved at —14— to properly support the feet of the operator, although it is evident that the ends of the pedal lever may be similarly operated by hand if desired.

The rear ends of the links —6— are pivotally connected to the outer bolts —11— which connect the front braces —3'— to the adjacent cross bar —9— and side rails —7—, the ends of the lower side of the front cross bar —9— being recessed at —15— to receive the adjacent ends of the links —6— and allow them to rock freely between the ends of said cross bar and upper faces of the adjacent braces —3'—, as shown more clearly in Figs. 2 and 4.

These bolts —11— which connect the outer edges of the platform to the front braces —3'— also serve as pivots about which said braces may rock horizontally so as to permit the deflection of the major portions of the runners in front of the rear braces —3—, and for this purpose the inner portions of the apexes of the front braces —3'— are provided with forwardly and rearwardly elongated slots —16— concentric with the outer pivotal bolts —11— for receiving the inner brace bolts, as —11'—.

The front ends of the links —6— are pivotally connected by bolts or rivets —16— to the under side of the pedal lever —5— at relatively short, but equal distances from the center pivotal bolt —13— and in order that these links may operate freely without interference with the underlying cross bar —4—, the adjacent portions of said cross bar are depressed to form recesses —17— of sufficient depth to assure the desired clearance for the links.

It is now evident that if the pedal lever —5— is rocked from its normal position, shown in Fig. 1, to an angular position, shown by dotted lines in Fig. 2, the major portions of the runners in front of the rear braces —3— will be deflected to the right, thereby causing a corresponding horizontal rocking movement of the front braces —3'—, which enables the deflection of the runners to extend with gradually reducing degrees to the rear braces and accelerates the divergence of the sled from a direct course to a greater extent than would be possible if the deflection of the runners only extended to the front braces.

Furthermore, by connecting the pedal lever —5— to the forwardly diverging ends of the links —6— close to the central pivot —13— in the manner described produces a powerful leverage and enables the front ends of the runners to be deflected with a relatively low degree of power which is obviously of great advantage, when it is considered that these sleds are frequently operated by small children.

What I claim is:

1. In a hand sled of the character described, the combination of a pair of runners, the front ends of which are free to yield laterally, front and rear sets of braces secured to said runners, a platform supported by said braces, a cross bar connecting the front upturned ends of the runners and supported wholly thereby independently of the platform, a pedal lever centrally pivoted to the cross bar, and links having their front ends pivotally connected to the pedal lever at relatively short distances from and at opposite sides of the central pivot and their rear ends pivotally connected to the front set of braces.

2. In a hand sled of the character described, the combination of a pair of runners, the front ends of which are free to yield laterally for steering purposes, a cross bar connecting the upturned front ends of the runners to cause them to move laterally in unison, said cross-bar being supported wholly by the front ends of the runners independently of the platform, a pedal lever centrally pivoted to the cross bar, braces secured to the runners, a platform mounted on the braces, and links connecting portions of the pedal lever at opposite sides of its pivot with opposite sides of the platform.

3. A hand sled having a platform and a pair of runners, the front ends of which are free to yield laterally relatively to the platform, front and rear sets of braces between the runners and platform, the front braces being pivoted to swing horizontally, a cross bar connecting the upturned front ends of the runners independently of the platform, a pedal lever centrally pivoted to the cross bar, and a pair of links having their front ends connected to the lever at opposite sides of its pivot and their rear ends pivotally connected to the pivots of the front braces.

In witness whereof I have hereunto set my hand this 16th day of February, 1918.

WILLIAM E. SHERWOOD.

Witnesses:
H. E. CHASE,
ALICE M. CANNON.